US010649623B2

(12) United States Patent
Milvaney et al.

(10) Patent No.: US 10,649,623 B2
(45) Date of Patent: May 12, 2020

(54) FILE ACTIVITY FEED FOR SMARTLY GROUPING ACTIVITIES INTO DISTINCT MODULES

(71) Applicant: Microsoft Technology Licensing, LLC, Redmond, WA (US)

(72) Inventors: Douglas L. Milvaney, Cambridge, MA (US); Taili Feng, Bellevue, WA (US); Manoj Sharma, Winchester, MA (US); Sophie I. Vennix, Houston, TX (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 386 days.

(21) Appl. No.: 14/942,525

(22) Filed: Nov. 16, 2015

(65) Prior Publication Data
US 2017/0139550 A1 May 18, 2017

(51) Int. Cl.
| | |
|---|---|
| *G06F 3/0482* | (2013.01) |
| *G06F 16/9535* | (2019.01) |
| *G06F 17/22* | (2006.01) |
| *G06F 3/0481* | (2013.01) |
| *G06F 3/0484* | (2013.01) |
| *G06F 7/08* | (2006.01) |
| *G06F 7/20* | (2006.01) |

(52) U.S. Cl.
CPC ........ *G06F 3/0482* (2013.01); *G06F 3/04817* (2013.01); *G06F 3/04842* (2013.01); *G06F 7/08* (2013.01); *G06F 7/20* (2013.01); *G06F 16/9535* (2019.01); *G06F 17/2288* (2013.01)

(58) Field of Classification Search
CPC combination set(s) only.
See application file for complete search history.

(56) References Cited

U.S. PATENT DOCUMENTS

| | | | |
|---|---|---|---|
| 7,568,151 B2 | 7/2009 | Bargeron et al. | |
| 8,417,666 B2 | 4/2013 | Bailor et al. | |
| 8,484,292 B2 | 7/2013 | Spataro et al. | |
| 8,965,983 B2 * | 2/2015 | Costenaro | G06F 17/241 |
| | | | 705/311 |
| 9,501,531 B2 * | 11/2016 | Sinha; Avijit | H04L 67/22 |

(Continued)

OTHER PUBLICATIONS

Lavrusik, Vadim, "Improving Conversations on Facebook with Replies", Published on: Mar. 25, 2013 Available at: https://www.facebook.com/notes/journalists-on-facebook/improving-conversations-on-facebook-with-replies/578890718789613.
Liccardi, et al., "CAWS: A Wiki System to Improve Workspace Awareness to Advance Effectiveness of Co-Authoring Activities", In Proceedings of Conference on Human Factors in Computing Systems, Apr. 28, 2007, pp. 2555-2560.

(Continued)

*Primary Examiner* — Farhan M Syed

(57) ABSTRACT

Aspects of the present disclosure relate to systems and methods for creating a file activity feed for display on a user interface of a client computing device. In one aspect, data comprising a plurality of activities associated with a file may be obtained. Two or more activities from the plurality of activities may be grouped into a single module of work for display within the file activity feed. The file activity feed may be displayed on the user interface of the client computing device. In some cases, the file activity feed includes one or more file activity elements including at least the single module of work. In some cases, the file activity feed includes a filter icon and a query feature. The filter icon may provide one or more filter preferences for filtering the file activity feed. The query feature may facilitate querying the file activity feed.

20 Claims, 8 Drawing Sheets

(56) References Cited

U.S. PATENT DOCUMENTS

| | | | |
|---|---|---|---|
| 2006/0282762 | A1 | 12/2006 | Diamond et al. |
| 2007/0168885 | A1 | 7/2007 | Muller et al. |
| 2011/0137940 | A1 | 6/2011 | Gradin et al. |
| 2011/0178981 | A1 | 7/2011 | Bowen et al. |
| 2012/0284344 | A1* | 11/2012 | Costenaro ............. G06F 17/241 709/206 |
| 2012/0296919 | A1* | 11/2012 | Sinha ...................... H04L 67/22 707/749 |
| 2013/0091214 | A1* | 4/2013 | Kellerman ............. G06Q 10/00 709/204 |
| 2013/0117376 | A1 | 5/2013 | Filman et al. |
| 2014/0082469 | A1 | 3/2014 | Sitrick et al. |
| 2014/0082525 | A1 | 3/2014 | Kass et al. |
| 2014/0281870 | A1 | 9/2014 | Vogel et al. |
| 2014/0282078 | A1 | 9/2014 | Taylor et al. |
| 2014/0289645 | A1 | 9/2014 | Megiddo et al. |
| 2014/0331126 | A1 | 11/2014 | Hunter et al. |
| 2015/0149153 | A1* | 5/2015 | Werth ................. G06F 17/2785 704/9 |
| 2016/0239918 | A1* | 8/2016 | Lambur ................. G06Q 40/06 |
| 2017/0064041 | A1* | 3/2017 | Sinha ...................... H04L 67/22 |
| 2017/0090704 | A1* | 3/2017 | Hu ........................ G06F 3/0484 |

OTHER PUBLICATIONS

Gunn, Ian, "A New Activity Stream in Drive Shows You What's Changed", Published on: Jan. 14, 2014 Available at: http://googledrive.blogspot.co.uk/2014/01/a-new-activity-stream-in-drive-shows.html.

Karlitschek, Frank, "Great new Community Feature: Activity Stream", Published on: Nov. 5, 2013 Available at: https://owncloud.com/great-new-community-feature-activity-stream/.

Ace, Mark, "A New, Mobile-Friendly View of Important Activity", Published on: Jul. 16, 2015 Available at: http://www.kavi.com/mobile-ready-activity-feed/.

U.S. Appl. No. 62/141,639, McNeill, et al., "Next-Generation Merged Activity and Document History Stream", filed Apr. 1, 2015.

"International Search Report and Written Opinion Issued in PCT Application No. PCT/US2016/061031", dated Feb. 16, 2017, 12 pages.

"Second Written Opinion Issued in PCT Application No. PCT/US2016/061031", dated Oct. 5, 2017, 7 Pages.

"International Preliminary Report on Patentability Issued in PCT Application No. PCT/US2016/061031", dated Jan. 31, 2018, 8 Pages.

\* cited by examiner

FIG 2

FILE ACTIVITY FEED FOR SMARTLY GROUPING ACTIVITIES INTO DISTINCT MODULES

BACKGROUND

Computer and software users have grown accustomed to user-friendly software applications for co-authoring files, documents, messages, and the like. For example, storage providers (e.g., cloud storage providers) provide applications such as word processing applications, spreadsheet applications, electronic slide presentation applications, email applications, chat applications, voice applications, and the like, where users can co-author and collaborate with one another within the applications. As more users share, co-author, and collaborate on documents created with these applications, it becomes increasingly difficult for users to stay apprised of changes to the documents, whether users are in or away from the applications. Current techniques for solving this problem include presenting content changes next to the document canvas while users are synchronously in an application. Additionally, the content changes are also shown in the document canvas. As such, current techniques for apprising users of content changes result in an overwhelming amount of data that is distracting, duplicated, cluttered, and difficult to parse. In turn, current techniques for informing users of content changes in applications are inefficient and inadequate.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In summary, the disclosure generally relates to systems and methods for creating a file activity feed for display on a user interface of a client computing device. In one aspect, data comprising a plurality of activities associated with a file may be obtained. Two or more activities from the plurality of activities may be grouped into a single module of work for display within the file activity feed. The file activity feed may be displayed on the user interface of the client computing device. In some cases, the file activity feed includes one or more file activity elements including at least the single module of work.

In another aspect, a file activity feed may be displayed on a user interface of a client computing device, where the file activity feed includes one or more file activity elements and a filter icon. In response to receiving a selection of the filter icon, a filter preference pane including one or more filter preferences for filtering the file activity feed may be rendered on the user interface. In response to receiving a selection of at least one of the one or more filter preferences, the file activity feed may be filtered based on the selection of the at least one of the one or more filter preferences. The filtered file activity feed may be displayed on the user interface of the client computing device.

DESCRIPTION OF THE DRAWINGS

The detailed description is described with reference to the accompanying figures. In the figures, the left-most digit(s) of a reference number identifies the figure in which the reference number first appears. The use of the same reference numbers in different instances in the description and the figures may indicate similar or identical items.

FIG. 2 illustrates one view of an electronic slide application displayed on a user interface of a client computing device, according to an example aspect.

DETAILED DESCRIPTION

Figure 1:
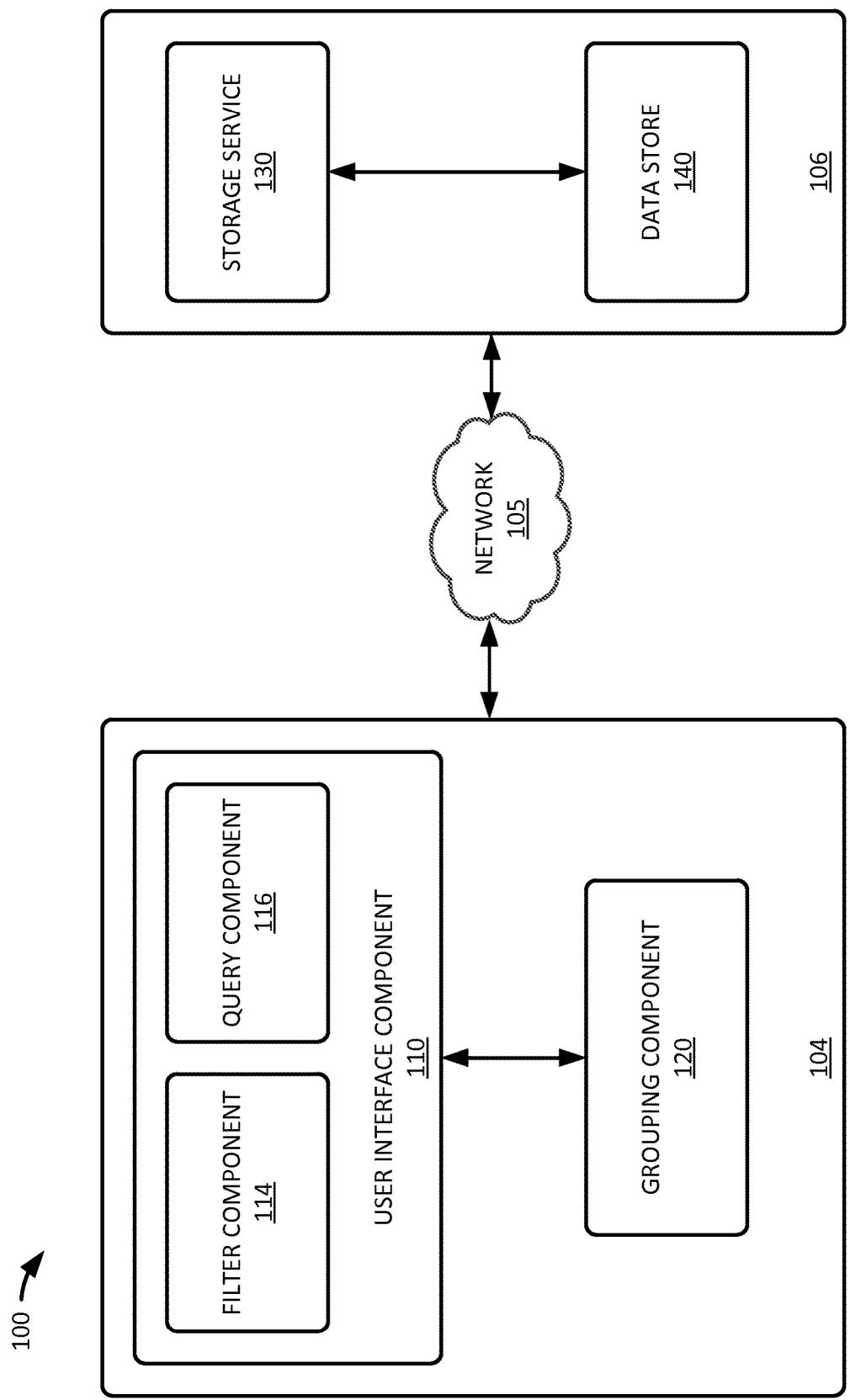
FIG. 1 illustrates an exemplary file activity system for creating a file activity feed, according to an example aspect.

Aspects of the disclosure are generally directed to creating a file activity feed for display on a user interface of a client computing device. For example, the file activity feed may organize activities related to a file associated with an application and activities that surround a file associated with an application. In some examples, the activities related to the file may include activities such as content changes in the file (e.g., edits and deletions), sharing the file, renaming the file, comments within the file, messaging, and the like. In some examples, the activities that surround the file may include activities such as conversations around the document (e.g., email communications and/or messaging communications that discuss and/or reference the file), and the like. In one aspect, data comprising a plurality of activities associated with a file may be obtained. The file activity feed aggregates the plurality of activities and uses specialized logic to smartly organize and group the plurality of activities into distinct, scenario-optimized modules of work. The distinct, scenario-optimized module of work may include a single module of work. In one example, the single module of work is a distinct file activity element within the file activity feed that includes multiple activities and metadata associated with the multiple activities. In this regard, the single module of work may be a scenario-optimized module of work. In one example, when the plurality of activities include five edits to the file by two users/co-authors, instead of displaying each edit separately in the file activity feed, the file activity feed may group the five edits into a single module of work that includes both users/co-authors' identities and indicates that edits were made and at what time. In this regard, the single module of work may be displayed within the file activity feed and may be quickly and efficiently identified.

In some cases, the plurality of activities may be grouped by identifying patterns and/or similarities among the plurality of activities. In one example, the patterns and/or similarities may be identified based on one or more factors including a number of co-authors, a number of similar activities in a row, a time of the activity, and the like. Using the example described above, two co-authors and five similar activities (e.g., edits) were identified. As such, the file activity feed grouped the plurality of activities into a single, scenario-optimized module of work as two co-authors editing the file. As discussed above, as more users share, co-author, and collaborate on applications it becomes increasingly difficult for users to stay apprised of changes to the documents created in these applications, whether users are in or away from the applications. Current techniques for solving this problem include presenting content changes next to the document canvas while users are synchronously in an application. Additionally, the content changes are also shown in the document canvas. As such, current techniques for apprising users of content changes result in an overwhelming amount of data that is distracting, duplicated, cluttered, and difficult to parse. In turn, current techniques for informing users of content changes in documents are inefficient and inadequate.

Accordingly, aspects described herein include smartly organizing and grouping a plurality of activities associated with a file into distinct, scenario-optimized modules of work for display within a file activity feed. In this regard, data comprising a plurality of activities associated with a file may be obtained. In one example, two or more activities from the plurality of activities may be grouped into a single module of work for display within the file activity feed. The file activity feed may be displayed on the user interface of the client computing device. In some cases, the file activity feed includes one or more file activity elements including at least the single module of work. In some cases, the data is obtained on a per user/co-author basis. For example, a different file activity feed may be created for each user/co-author of the file. In this regard, the file activity feed may include activities and distinct modules of work that have occurred since the co-author last viewed the file. As such, co-authors may asynchronously work within a file and still be informed of any activities that have occurred while they were away from the file. Additionally, by only displaying those activities that have occurred since the co-author last viewed the document, the file activity feed remains free from clutter, an overwhelming amount of data, and repetition, while facilitating an optimized experience for users and/or co-authors to catch up with activities that have occurred while they were away from the file. A technical effect that may be appreciated is that the activities are organized and displayed within the file activity feed in a clear, understandable, and functional surface so that a user may quickly and efficiently understand and identify who authored an activity, what activity occurred, and at what time the activity occurred.

Further aspects described herein include making the file activity feed both filterable and queryable based on preferences of each user and/or co-author of the file. For example, users and/or co-authors of a file may choose to filter and/or query their file activity feed by and/or for particular types of activities, date ranges, and/or users who performed the activity. In this regard, the file activity feed may be customizable to include per-user views that best suit an individual's preferences and/or current goals for consuming the file activity feed. In aspects, in response to receiving a selection of the filter icon, a filter preference pane including one or more filter preferences for filtering the file activity feed may be rendered on the user interface. In response to receiving a selection of at least one of the one or more filter preferences, the file activity feed may be filtered based on the selection of the at least one of the one or more filter preferences. The filtered file activity feed may be displayed on the user interface of the client computing device. Accordingly, another technical effect that may be appreciated is that users and/or co-authors of a file may quickly, easily, and efficiently view those activities that are most of interest to them, as well as narrow the set of activities displayed within the file activity feed to those activities that are important to them and/or specifically directed to them. Furthermore, another technical effect that may be appreciated is that the filtering and querying functionality of the file activity feed occurs on the client computing device and therefore avoids incurring network roundtrip costs and does not affect the data server storage.

Referring now to the drawings, in which like numerals represent like elements through the several figures, aspects of the present disclosure and the exemplary operating environment will be described. With reference to FIG. 1, one aspect of a file activity system 100 for creating a file activity feed for display on a user interface of a client computing device is illustrated. In aspects, the file activity system 100 may be implemented on a client computing device 104. In a basic configuration, the client computing device 104 is a handheld computer having both input elements and output elements. The client computing device 104 may be any suitable computing device for implementing the file activity system 100 for creating a file activity feed for display on a user interface of the client computing device 104. For example, the client computing device 104 may be at least one of: a mobile telephone; a smart phone; a tablet; a phablet; a smart watch; a wearable computer; a personal computer; a desktop computer; a laptop computer; a gaming device/computer (e.g., Xbox); a television; and etc. This list is exemplary only and should not be considered as limiting. Any suitable client computing device 104 for implementing the file activity system 100 for creating a file activity feed for display on a user interface of the client computing device 104 may be utilized.

In aspects, the file activity system 100 may be implemented on a server computing device 106. The server computing device 106 may provide data to and from the client computing device 104 through a network 105. In aspects, the file activity system 100 may be implemented on more than one server computing device 106, such as a plurality of server computing devices 106. As discussed above, the server computing device 106 may provide data to and from the client computing device 104 through the network 105. The data may be communicated over any network suitable to transmit data. In some aspects, the network is a distributed computer network such as the Internet. In this regard, the network may include a Local Area Network (LAN), a Wide Area Network (WAN), the Internet, wireless and wired transmission mediums. In this regard, a file activity feed including a plurality of activities may be created for display on a user interface of the client computing device 104.

The aspects and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, multiprocessor systems, microprocessor-based or programmable consumer electronics, minicomputers, and mainframe computers.

In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an Intranet. User interfaces and information of various types may be displayed via on-board computing device displays or via remote display units associated with one or more computing devices. For example, user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

As illustrated in FIG. 1, the file activity system 100 may include a user interface component 110, a grouping component 120, a storage service 130, and a data store 140. The various components may be implemented using hardware, software, or a combination of hardware and software. The file activity system 100 may be configured to create a file activity feed for display on a user interface of the client computing device 104. In this regard, the user interface component 110 may be configured to display a file associated with an application and a file activity feed including at least a plurality of activities and associated functionality. In one example, the associated functionality may include filtering and querying functionality. In this regard, the user interface component 110 may include a filter component 114 and a query component 116, which will be discussed in more detail below. In one example, the user interface component 110 may be a touchable user interface that is capable of receiving input via contact with a screen of the client computing device 104, thereby functioning as both an input device and an output device. For example, content may be displayed, or output, on the screen of the client computing device 104 and input may be received by contacting the screen using a stylus or by direct physical contact of a user, e.g., touching the screen. Contact may include, for instance, tapping the screen, using gestures such as swiping or pinching the screen, sketching on the screen, etc.

In another example, the user interface component 110 may be a non-touch user interface. In one case, a tablet device, for example, may be utilized as a non-touch device when it is docked at a docking station (e.g., the tablet device may include a non-touch user interface). In another case, a desktop computer may include a non-touch user interface. In this example, the non-touchable user interface may be capable of receiving input via contact with a screen of the client computing device 104, thereby functioning as both an input device and an output device. For example, content may be displayed, or output, on the screen of the client computing device 104 and input may be received by contacting the screen using a cursor, for example. In this regard, contact may include, for example, placing a cursor on the non-touchable user interface using a device such as a mouse.

In aspects, the grouping component 120 may be configured to determine whether and how to group activities into a single module of work for display within a file activity feed. In one implementation, the grouping component 120 may obtain data including a plurality of activities associated with a file. In one example, the plurality of activities may include both client side activities and server side activities. For example, the plurality of activities may include activities associated with the client computing device 104 and activities associated with the server computing device 106. In one example, the plurality of activities may include content changes, communication activities, document content exchanges, permission requests, sharing, printing, a time associated with the activities (e.g., the time the file is printed, the time the file was shared, the time the file was edited), and the like. In aspects, the server computing device 106 is unaware of the plurality of activities associated with the client computing device 104 and the client computing device 104 is unaware of the plurality of activities associated with the server computing device 106. In one example, the plurality of activities associated with the client computing device 104 may include communications such as Instant Messaging and/or voice communications, comments, email activities, presentation of the file, a time at which the file is printed, a time at which the file is co-authored, and the like. In one case, email activities may include a time at which a file was emailed, the content of the file at the time at which the file was emailed, the sender and recipient of the email, and the like. In one example, the one or more activities associated with the server computing device 106 may include the recipient of a shared file, information associated with a renamed file, sharing a file, editing a file, renaming a file, information associated with a restored file (e.g., information regarding that the file was restored from a second version to a first version), and the like.

In some aspects, the grouping component 120 may obtain data from one or more sources. For example, the grouping component 120 may obtain data from at least the storage service 130 and the data store 140. In one example, the storage service 130 may be configured to store, manage, and access data and/or information associated with the file activity system 100. For example, the storage service 130 may store one or more files and/or one or more activities associated with a file in a data store 140. In another example, the data store 140 may include attribution information. In one case, attribution information may include information regarding the user/author performing an activity and/or a recipient of the plurality of activities. In one example, data store 140 may be part of and/or located at the storage service 130. In another example, data store 140 may be a separate component and/or may be located separate from the storage service 130. It is appreciated that although one server computing device 106 is illustrated in FIG. 1, the file activity system 100 may include a plurality of server computing devices 106 with a plurality of storage services 130 and a plurality of data stores 140. In some cases, the server computing device 106 may include a plurality of storage services 130 and a plurality of data stores 140. For example, the plurality of storage services 130 may include at least file storage providers, external activity services and document editing clients. In one example, the storage service 130 may be a cloud storage service such as OneDrive, SharePoint, Google Drive, Dropbox, and the like.

In aspects, the grouping component 120 may communicate with a plurality of storage services 130. In this regard, the grouping component 120 may retrieve and/or obtain one or more activities associated with one or more files that are stored in a plurality of storage services 130. For example, a user of the client computing device 104 may create and/or access a first file. In one case, the first file is located on the client computing device 104. In another case, the first file is located on a first storage service 130. A plurality of activities may be associated with the first file. The plurality of activities associated with the first file may be stored in a single storage service 130, a plurality of storage services 130, a single data store 140, and/or a plurality of data stores 140. In this regard, the grouping component 120 may obtain data including a plurality of activities, associated with a file, located on any number of and/or any type of storage services 130 for display within a file activity feed on the client computing device 104.

In one case, the data obtained may include metadata associated with the plurality of activities. For example, the metadata may include at least an identifier, a timestamp, and a type of activity. In one case, the identifier may be an identifier of a user and/or co-author of the file. The identifier may indicate the user and/or co-author who performed an activity. In one example, the timestamp may indicate a time at which the activity was performed. In another example, the timestamp may indicate an amount of time that has passed since an activity was performed. The type of activity may indicate the type of activity that occurred relative to the file such as any of the activities described herein.

In additional aspects, the grouping component 120 may group two or more activities from the obtained plurality of activities into a distinct module of work for display within the file activity feed. For example, the distinct module of work may be a single and/or distinct file activity element within the file activity feed that includes multiple activities and metadata associated with the multiple activities. In this regard, the single/distinct module of work may be a scenario-optimized module of work. For example, the grouping component 120 may identify one or more similarities and/or patterns among the plurality of activities based on one or more factors. In one case, the one or more factors may include a number of co-authors, a time co-authors join the file or an editing session associated with the file, a time co-authors leave the file or an editing session associated with the file, a type of activity (e.g., any of the activities described herein), a time of a content change, a duration of a content change, a size of a content change, a number of a same type of activity that has occurred in a row, and a number of a same type of activity that has occurred in a set period of time. Based on the one or more factors, varying activities may be grouped into the single module of work (e.g., scenario optimized) to better represent what happened to a file within a given time frame, for example. In one example, the optimized scenarios may include single authoring, simultaneous co-authoring, and asynchronous co-authoring.

In some implementations, the grouping component 120 may group two or more activities by identifying a user and/or author and a type of activity for each activity of the plurality of activities. In one case, the grouping component 120 may determine whether the same user/author performed the same type of activity a number of times in a row. If it is determined that the same user/author performed the same type of activity a number of times in a row, the grouping component 120 may group the activities of the same type performed by one user/author into a single module of work for display within the file activity feed. If it is determined that the same user/author performed a variety of different types of activities a number of times in a row, the grouping component 120 may determine not to group the different types of activities and the different types of activities may each be displayed within the file activity feed.

In another case, the grouping component 120 may determine whether different users/co-authors performed the same type of activity a number of times in a row. If it is determined that the different users/co-authors performed the same type of activity a number of times in a row, the grouping component 120 may group the activities of the same type performed by different users/co-authors into a single module of work for display within the file activity feed. In this case, the single module of work may include the identities of each co-author who performed the same type of activity in a row. In some cases, when it is determined that different users/co-authors performed the same type of activity a number of times in a row, the grouping component 120 may identify a size, time, and/or duration of the same type of activity performed to determine whether to group the activities into a single module of work. For example, when different co-authors all edit a file a number of times in a row, the grouping component 120 may group the edits by the different co-authors if the edits happened within a relatively short (e.g., one-hour) time span and/or the size of the edits are relatively small. In another example, the grouping component 120 may not group the edits by the different co-authors if the edits happened over a relatively long (e.g., six-hour time) span and/or the size of the edits are relatively big. The examples described herein are exemplary only and should not be considered as limiting. For example, while time spans of activities (e.g., file edits) are described relative to particular time spans (e.g., one hour and six hours), any time span for grouping or not grouping activities may be defined and used within the present disclosure. In one case, if it is determined that different users/co-authors performed a variety of different types of activities a number of times in a row, the grouping component 120 may determine not to group the different types of activities performed by different co-authors, and the different types of activities may instead each be displayed within the file activity feed.

In other implementations, the grouping component 120 may group two or more activities by identifying an identity of a user and/or author, a type of activity for each activity of the plurality of activities, and other metadata and/or factors associated with the two or more activities, such as a time co-authors join the file or an editing session associated with the file, a time co-authors leave the file or an editing session associated with the file, a time of an activity, a duration of an activity, a size of an activity, a number of a same type of activity that has occurred in a row, and a number of a same type of activity that has occurred in a set period of time. It is appreciated that while example scenarios for grouping activities into a single module of work for display within the file activity feed are described herein, the discussion of the scenarios for grouping activities into a single module of work for display within the file activity feed is exemplary only and should not be considered as limiting.

In some aspects, the grouping component 120 may be part of and/or located at the user interface component 110. In other aspects, the grouping component 120 may be a separate component and/or may be located separately from the user interface component 120. In yet other aspects, portions of the grouping component 120 may be located at the user interface component 110, and portions of the grouping component 120 may be separate from the user interface component 110.

As discussed above, the user interface component 110 may include a filter component 114 and a query component 116. The filter component 114 may be configured to filter the file activity feed based on preferences of each user and/or co-author of a file. For example, users and/or co-authors of a file may choose to filter their file activity feed by and/or for particular types of activities, date ranges, and/or users who performed the activity. In this regard, the file activity feed may be customizable to include per-user views that best suit an individual's preferences and/or current goals for consuming the file activity feed. In one case, the filter component 114 may include a filter preference pane including one or more filter preferences for filtering the file activity feed. In this regard, the filter component 114 may filter the file activity feed based on a selection of at least one of the one or more filter preferences. In one example, the one or more filter preferences for filtering the file activity feed may include at least a type of activity, a timestamp associated with an activity, and an identifier associated with an activity. In one case, the type of activity may indicate the type of activity that occurred and/or was performed by a user relative to the file such as any of the activities described herein. For example, the one or more filter preferences may include an edit type of activity. In this case, a user may filter the file activity feed by edit activities. In one example, the timestamp may indicate a time at which the activity was performed. In another example, the timestamp may indicate an amount of time that has passed since an activity was performed. For example, the one or more filter preferences may include a timestamp. In this case, a user may filter the file activity feed by activities that occurred at a specific time and/or within a certain time period (e.g., within the last hour), for example. The identifier associated with the activity may be an identifier of a user and/or co-author of the file who performed an activity. For example, the one or more filter preferences may include a user/author identifier. In this case, a user may filter the file activity feed by a user/author identifier. In one case, the user/author identifier is the name of the user/author.

In some cases, the file activity feed may be filtered for use in a notification. For example, a user may receive a notification including one or more activities that have occurred to a file within a specific period of time (e.g., within the last week). When the user receives the notification, the user may open the file from the notification. When the file is opened from the notification, the file may include a filtered file activity feed based on the one or more activities included in the notification (e.g., the one or more activities that have occurred within the last week). In some examples, the filter preference pane may be rendered on a user interface of the client computing device 104 within a file in response to receiving a selection of a filter icon. In one example, the filter icon may be located within the file activity feed. In another example, the filter icon may be located within the file associated with the file activity feed but not necessarily within the file activity feed.

The query component 116 may include a query feature for querying the file activity feed. For example, users and/or co-authors of a file may choose to query their file activity feed by and/or for particular types of activities, date ranges, and/or users who performed the activity. In one case, the query feature may provide for a natural language query. A user may input a natural language query into the query feature including at least one of a type of activity, a timestamp associated with an activity, and an identifier associated with an activity. In one example, a user may input a specific date and/or time relative to an activity in the file activity feed. In this case, the activities and/or distinct modules of work within the file activity feed that include the specific date and/or time may be highlighted within the file activity feed so that a user may easily and quickly identify them. In another example, the activities and/or distinct modules of work within the file activity feed that include the specific date and/or time may be moved and inserted into a top position within the file activity feed so that a user may easily and quickly identify them. Accordingly, users and/or co-authors of a file may quickly, easily, and efficiently view those activities that are most of interest to them, as well as narrow the set of activities displayed within the file activity feed to those activities that are important to them and/or specifically directed to them. It is appreciated that while examples for filtering and/or querying activities are described herein, the discussion of filtering and/or querying activities is exemplary only and should not be considered as limiting.

Figure 2:
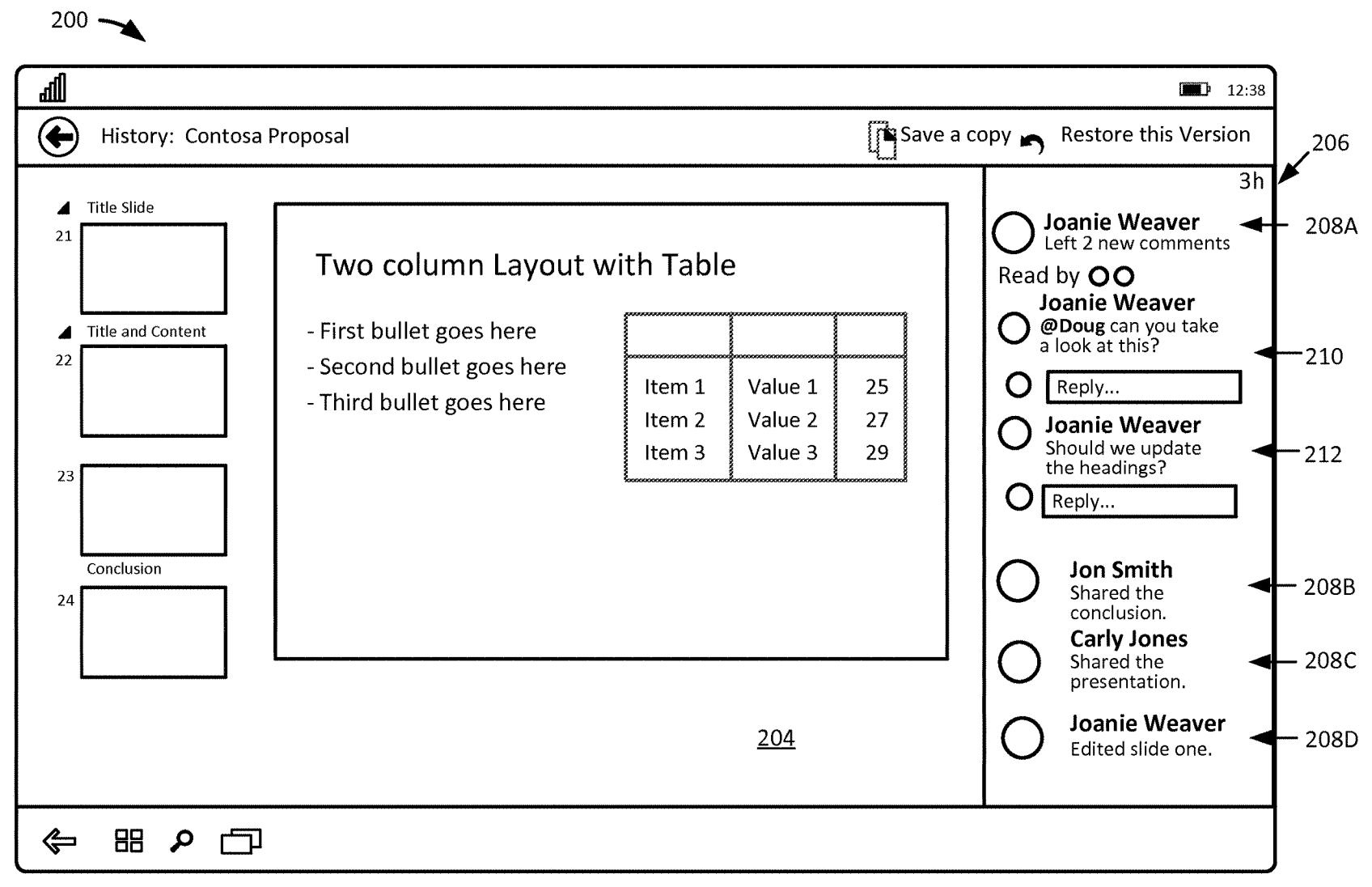

Referring now to FIG. 2, an example view 200 of an application displayed on a user interface of the client computing device 104, such as a desktop computer, tablet computer or a mobile phone, for example, is shown. The exemplary application, as shown in FIG. 2, is an electronic slide application. In one example, an application may include any application suitable for collaboration and/or co-authoring such as word processing applications, spreadsheet applications, electronic slide presentation applications, email applications, chat applications, voice applications, and the like. In one case, a file associated with the application may include a word document, a spreadsheet, an electronic slide presentation, an email, a chat conversation, and the like. As such, an exemplary application may be an electronic slide presentation application, as illustrated in FIG. 2. In this example, an exemplary file associated with the electronic slide presentation application may include an electronic slide presentation. As such, an exemplary file activity feed (e.g., the file activity feed associated with the electronic slide presentation) may include one or more activities associated with the electronic slide presentation.

As illustrated, the exemplary view 200 of the electronic slide application displayed on the client computing device 104 includes a file 204, a file activity feed 206, and a plurality of file activity elements 208A-208D. The file activity elements 208A-208D are exemplary file activity elements of the file activity feed 206. It is appreciated that while FIG. 2 illustrates file activity elements 208A-208D of the file activity feed 206, the discussion of file activity elements 208A-208D and the file activity feed 206 is exemplary only and should not be considered as limiting. Any suitable number and/or type (e.g., distinct modules of work and/or activities) of file activity elements of the file activity feed 206 may be displayed on the client computing device 104. Furthermore, while the present disclosure discusses the electronic slide application, file 204, and file activity feed 206, this is only exemplary and should not be considered limiting. Any number of applications, files, and/or file activity feeds may be utilized in conjunction with the present disclosure.

As illustrated in FIG. 2, the file activity elements 208A-208D of the file activity feed 206 include a single module of work and a plurality of activities associated with the file 204. In the exemplary example illustrated in FIG. 2, the file 204 is an electronic slide presentation. As discussed above, the file 204 may be any file of any application suitable for co-authoring and collaboration between one or more users/authors. As discussed above, the grouping component 120 may be configured to group two or more activities into a single module of work. File activity element 208A is a single module of work. As shown by file activity element 208A, two activities were performed and grouped into a single module of work. The two activities performed are comments 210 and 212. The user/author identifier is Joanie Weaver. In this regard, a single user/author identifier performed the same type of activity. As such, the grouping component 120 determined to group the two comments 210 and 212 into a single module of work. In some cases, the file activity elements 208A-208D are expandable and collapsible. In this regard, file activity element 208A (e.g., the single module of work including the two comments 210 and 212) may be expanded. When the single module of work is expanded, the two or more activities grouped into the single module of work are viewable. For example, when the file activity element 208A is expanded, the two comments 210 and 212 are viewable. In this regard, a user may view the details of the two comments. File activity feed 206 illustrates the file activity element 208A expanded such that comments 210 and 212 are viewable. In some cases, file activity element 208A may be collapsed such that the two comments 210 and 212 are not viewable and only file activity element 208A is displayed within the file activity feed 206.

In some cases, the one or more file activity elements 208A-208D include at least one activity of the plurality of activities associated with the file 204 that is different from the two or more activities grouped into the single module of work. For example, file activity element 208A is a distinct module of work including two activities of the type, "comments," and file activity element 208B and file activity element 208C are activities of the type, "share", and file activity element 208D is an activity of the type, "edit." In some examples, the plurality of activities include a same type of activity. For example, file activity element 208B and file activity element 208C both include an activity of the type, "share." However, file activity element 208B and file activity element 208C have different authors. As such, the grouping component 120 may have determined not to group these activities into a single module of work. In some examples, at least one of the plurality of activities includes a different type of activity than at least another one of the plurality of activities. For example, file activity elements 208B and 208C include an activity of type, "share," and file activity element 208D includes an activity of type, "edit."

In aspects, the file activity feed 206 may include a timestamp. For example, the file activity feed 206 includes the timestamp "3 h." In this example, the single module of work and plurality of activities of the file activity elements 208A-208D may have occurred three hours prior to when the file 204 is viewed and/or opened by a user. In some cases, a user identifier including a last view timestamp is associated with the file 204. The last view timestamp is the time at which a particular user and/or author last viewed a particular file. In this regard, the file activity elements 208A-208D may include the single module of work and the plurality of activities that have occurred since the last view timestamp of the user identifier associated with the file. For example, when a first user opens the file 204, only those activities that have occurred since the first user last viewed and/or opened the file 204 may be displayed in the file activity feed 206. In another example, when a second user opens the file 204, only those activities that have occurred since the second user last viewed and/or opened the file 204 may be displayed in the file activity feed 206. In this regard, a different file activity feed 206 with different activities and/or distinct modules of work may be displayed for each user and/or co-author of a file (e.g., the file 204) based on the last view timestamp of each user and/or co-author of a file. As such, an overwhelming amount of data that is distracting, duplicated, cluttered, and difficult to parse may be avoided.

In some cases, when a user opens the file 204, if content changes have been made to the file 204, the content changes may be shown within the file 204. In one example, the content changes may be highlighted so that the content changes can be quickly and easily identified. In one case, a user may have to take an action to view the file activity feed 206. For example, in response to receiving a selection of a file activity feed icon, the file activity feed 206 may be displayed on a user interface of the client computing device 104. In one example, as illustrated in FIG. 2, the file activity feed 206 may be displayed next to the file 204 canvas. In another example, the file activity feed 206 may be displayed anywhere within the file 204. It is appreciated that the file activity feed 206 may be displayed anywhere on the user interface of the client computing device 104. In another case, the file activity feed 206 may be displayed on a user interface of the client computing device 104 in response to opening the file 204.

In one example, the file activity feed 206 is ordered by time. For example, the file activity element 208A may show the latest activity of the file 204. File activity element 208B may show a previous activity of the file 204. In some cases, the time is in chronological order. In other cases, the time is in reverse chronological order. In another example, the file activity feed 206 is ordered based on the activity. In yet another example, the file activity feed 206 is ordered based on the authors and/or co-authors of the file 204. In some examples, the file activity elements 208A-208D may be identified on a user interface by at least one of glyphs, profile images, and text. One of ordinary skill in the art will appreciate that other mechanisms may be used for ordering the file activity feed 206, such as importance, priority, frequency, and/or other characteristics of the activities. The examples provided herein are illustrative only, and are not intended to be limiting.

Figure 3A:
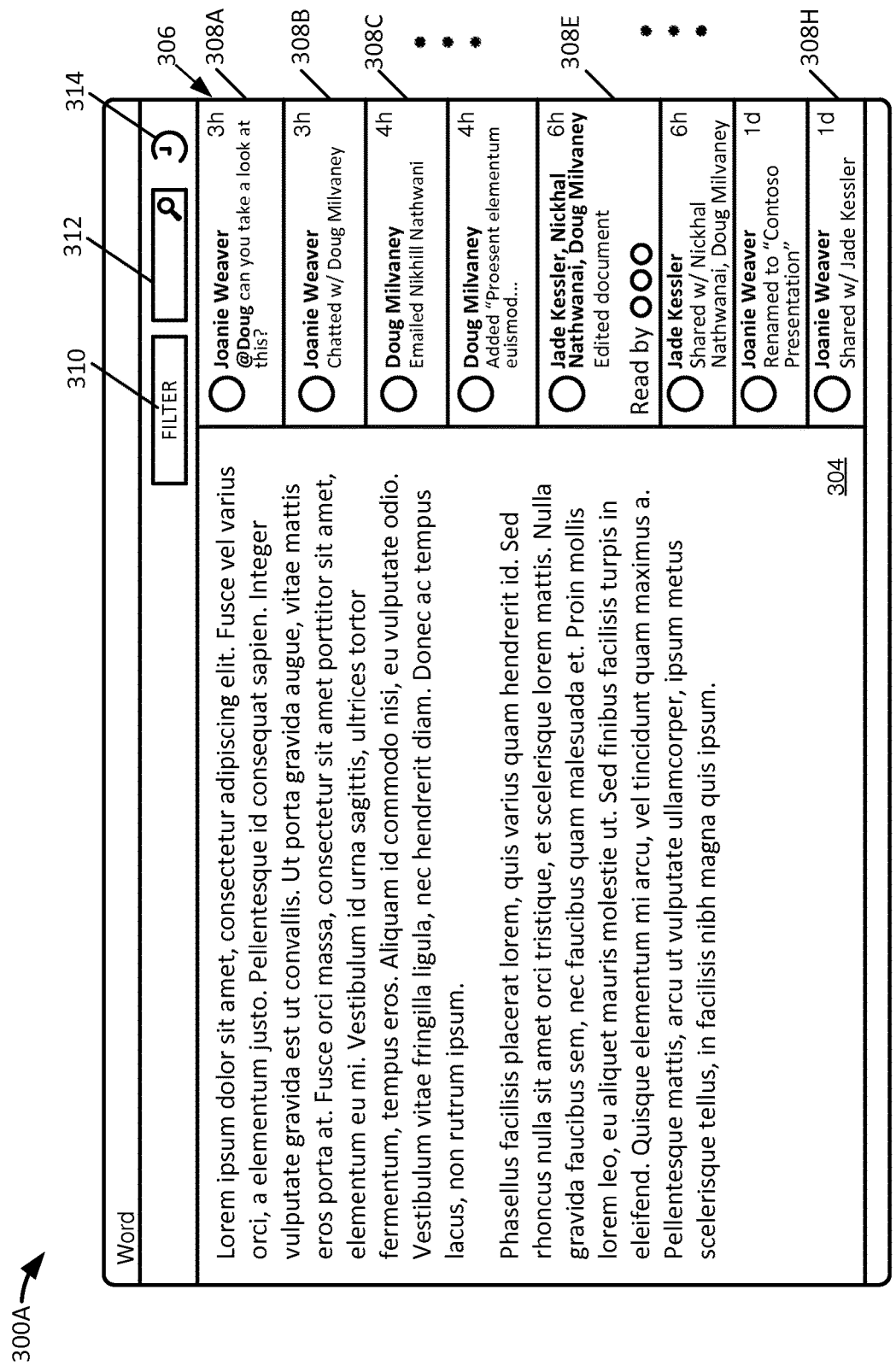
FIG. 3A illustrates one view in a progression of views of a word processing application, according to an example aspect.

Referring now to FIG. 3A, one view 300A in a progression of views of a word processing application displayed on a user interface of the client computing device 104, such as a desktop computer, tablet computer or a mobile phone, for example, is shown. As illustrated, the exemplary view 300A of the word processing application displayed on the client computing device 104 includes a file 304, a file activity feed 306, a plurality of file activity elements 308A-308H, a filter icon 310, a query feature 312, and a file activity feed icon 314. The file activity elements 308A-308H are exemplary file activity elements of the file activity feed 306. It is appreciated that while FIG. 3A illustrates file activity elements 308A-308H of the file activity feed 306, the discussion of file activity elements 308A-308H and the file activity feed 306 is exemplary only and should not be considered as limiting. Any suitable number and/or type (e.g., distinct modules of work and/or activities) of file activity elements of the file activity feed 306 may be displayed on the client computing device 104. Furthermore, while the present disclosure discusses the word processing application, file 304, and file activity feed 306, this is only exemplary and should not be considered limiting. Any number of applications, files, and/or file activity feeds may be utilized in conjunction with the present disclosure.

As illustrated in FIG. 3A, the file activity elements 308A-308H of the file activity feed 306 include a single module of work and a plurality of activities associated with the file 304. As discussed above, the file 304 may be any file of any application suitable for co-authoring and collaboration between one or more users/authors. As discussed above, the grouping component 120 may be configured to group two or more activities into a single module of work. File activity element 308E is a single module of work. As shown by file activity element 308E, three activities were performed and grouped into a single module of work. In particular, three co-authors edited the file 304. In this regard, three co-authors performed the same type of activity. As such, the grouping component 120 determined to group the three edits by different co-authors into a single module of work. The file activity elements 308A-308H described relative to FIG. 3A include the same and/or similar functionality as the file activity elements 208A-208D described above relative to FIG. 2. For example, the file activity elements 308A-308H may be expanded and collapsed. As such, when file activity element 308E is expanded, details of the three edits may be viewed (not illustrated). File activity elements 308A, 308B, 308C and 308H illustrate a plurality of activities that occurred relative to file 304. For example, file activity element 308A includes a comment, file activity element 308B includes a messaging/chat activity, file activity element 308C includes an email activity, and file activity element 308H includes a sharing activity.

In some cases, the author identifier of each author may be highlighted in a different color and the corresponding edits made to the file 304 by each author may be highlighted in the same color as the corresponding author identifier to indicate the edits made by each author. For example, relative to file activity element 308E, if the first author identifier, Jade Kessler, is highlighted in blue, the edits made by Jade Kessler in the file 304 (e.g., in the file canvas) may also be highlighted in blue (not illustrated). In another example, if the second author identifier, Nickhal Nathwanai, is highlighted in green, the edits made by Nickhal Nathwanai in the file 304 may also be highlighted in green (not illustrated). In yet another example, if the third author identifier, Doug Milvaney, is highlighted in orange, the edits made by Doug Milvaney in the file 304 may also be highlighted in orange (not illustrated). In some cases, each activity element may include a timestamp, as illustrated in FIG. 3A.

As discussed above, the file activity feed 306 may be both filterable and queryable based on preferences of each user and/or co-author of the file 304. In one example, the filter icon 310 may be configured to provide a filter preference pane for filtering the file activity feed 306, which will be described in more detail relative to FIG. 3B. For example, users and/or co-authors of a file may choose to filter the file activity feed 306 by and/or for particular types of activities, date ranges, and/or users who performed the activity. In this regard, in response to receiving a selection of the filter icon 310, a filter preference pane including one or more filter preferences for filtering the file activity feed 306 may be rendered on the user interface. In one example, the filter icon 310 may be located within the file activity feed 306. In another example, the filter icon 310 may be located within the file 304.

In another example, the query feature 312 may facilitate querying the file activity feed 306. For example, users and/or co-authors of a file may choose to query the file activity feed 306 by and/or for particular types of activities, date ranges, and/or users who performed the activity. In one case, the query feature 312 may provide for a natural language query. A user may input a natural language query into the query feature 312 including at least one of a type of activity, a timestamp associated with an activity, and an identifier associated with an activity. In one example, a user may input a specific date and/or time relative to an activity in the file activity feed 306. In this case, the activities and/or single modules of work within the file activity feed 306 that include the specific date and/or time may be highlighted within the file activity feed 306, such that a user may easily and quickly identify them. In another example, the activities and/or distinct modules of work within the file activity feed 306 that include the specific date and/or time may be moved and inserted into a top position within the file activity feed 306 so that a user may easily and quickly identify them. In one example, upon receiving a selection of the file activity feed icon 314, the file activity feed 306 may be rendered and displayed on a user interface of the client computing device 104.

In some aspects, the file activity elements 308A-308H are actionable. In one case, when a user selects a file activity element, the user may interact with the file activity element and take further action. For example, file activity element 308B shows a conversation between two users. File activity element 308B may be selected and expanded. As such, file activity element 308B may show the time of the conversation, the people involved in the conversation, the application used for the conversation, and a button to play the conversation in-line. As such, file activity element 308B is actionable. For example, a user may click on the conversation in-line to play and listen to the conversation. In another example, file activity element 308C shows an email activity. In one case, the email activity may include an email conversation associated with the file 304 (e.g., an email conversation that mentions the file 304). File activity element 308C may be selected and expanded. As such, file activity element 308C may show the time of the email, the people involved in the email, the contents of the email, a feature for responding to the email from the file activity element 308C, and the like. For example, a user may input a response to the email within the file activity element 308C and select a "send" button, for example. When an additional action (e.g., an additional response and/or conversation associated with the email) occurs, the file activity feed 306 will be updated to include the additional action in a file activity element. In this regard, a user may respond to a communication, such as an email within a file activity element, without opening a communication application, such as an email application. In turn, the file activity feed 306 provides for taking actions on external communications such as email, Instant Messaging, etc. In other examples, actionable file activity elements may include actions such as copying content from a file version, saving a copy of the file version, commenting in-line (e.g., instead of having to go to the comments pane to comment), viewing an archived chat conversation, watching an archived video chat conversation, replying to an existing comment in-line, resolving a comment in-line, changing user/author and/or file permissions in-line, and the like.

Figure 3B:
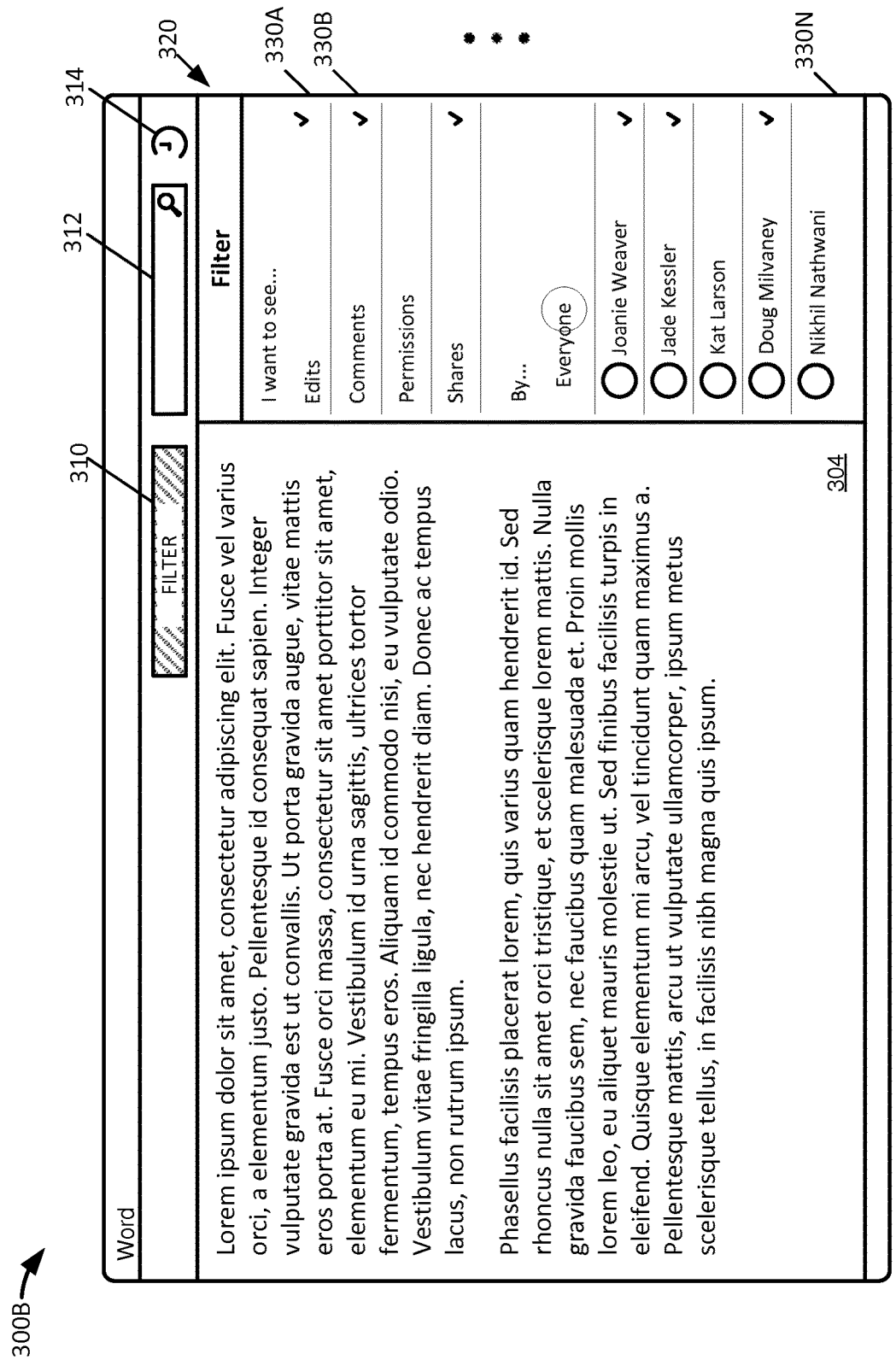
FIG. 3B illustrates another view in the progression of views of the word processing application of FIG. 3A, according to an example aspect.

Referring now to FIG. 3B, another view 300B in a progression of views of a word processing application displayed on a user interface of the client computing device 104, such as a desktop computer, tablet computer or a mobile phone, for example, is shown. As illustrated, the exemplary view 300B of the word processing application displayed on the client computing device 104 includes the file 304, the filter icon 310, the query feature 312, the file activity feed icon 314, a filter preference pane 320, and filter preferences 330A-330N. As shown in FIG. 3B, the filter icon 310 is selected. As such, in response to receiving a selection of the filter icon 310, the filter preference pane 320 including one or more filter preferences 330A-330N for filtering the file activity feed may be rendered on the user interface. In some examples, the filter preference pane 320 may be rendered within the file 104. In other examples, as illustrated in FIG. 3B, the filter preference pane 320 may be rendered within the file 304 next to the file contents within the canvas. In one case, the filter preference pane 320 may be rendered and/or displayed over the file activity feed (e.g., the file activity feed 306 illustrated in FIG. 3A).

In one example, the one or more filter preferences 330A-330N for filtering the file activity feed may include at least a type of activity, a timestamp associated with an activity, and an identifier associated with an activity. In one case, the type of activity may indicate the type of activity that occurred and/or was performed by a user relative to the file, such as any of the activities described herein. For example, filter preference 330A includes an edit type of activity and filter preference 330B includes a comments type of activity. Additional filter preference activities shown in FIG. 3B include permissions and shares. It is appreciated that any number of activities may be displayed as filter preferences within the filter preference pane 320. In one example, the timestamp may indicate a time at which the activity was performed. In another example, the timestamp may indicate an amount of time that has passed since an activity was performed. For example, the one or more filter preferences 330A-330B may include a timestamp (not illustrated). In this case, a user may filter the file activity feed by activities that occurred at a specific time and/or activities that occurred within a certain time period (e.g., within the last hour), for example. In one case, the identifier associated with the activity may be an identifier of a user and/or co-author of the file. The identifier may indicate the user and/or co-author who performed an activity. For example, filter preference 330N includes a user/author identifier. Additional filter preference identifiers are shown in filter preference pane 320 (e.g., Doug Milvaney, Kat Larson). It is appreciated that any number of identifiers may be displayed as filter preferences within the filter preference pane 320. In one case, the user/author identifier is the name of the user/author, for example as illustrated in FIG. 3B. In response to receiving a selection of at least one of the one or more filter preferences 330A-330N, the file activity feed 306 may be filtered based on the selection of the at least one of the one or more filter preferences 330A-330N. In the example illustrated in FIG. 3B, the activities including edits, comments, and shares are selected and the identifiers including Joanie Weaver, Jade Kessler, and Doug Milvaney are selected for filtering the file activity feed 306.

Figure 3C:
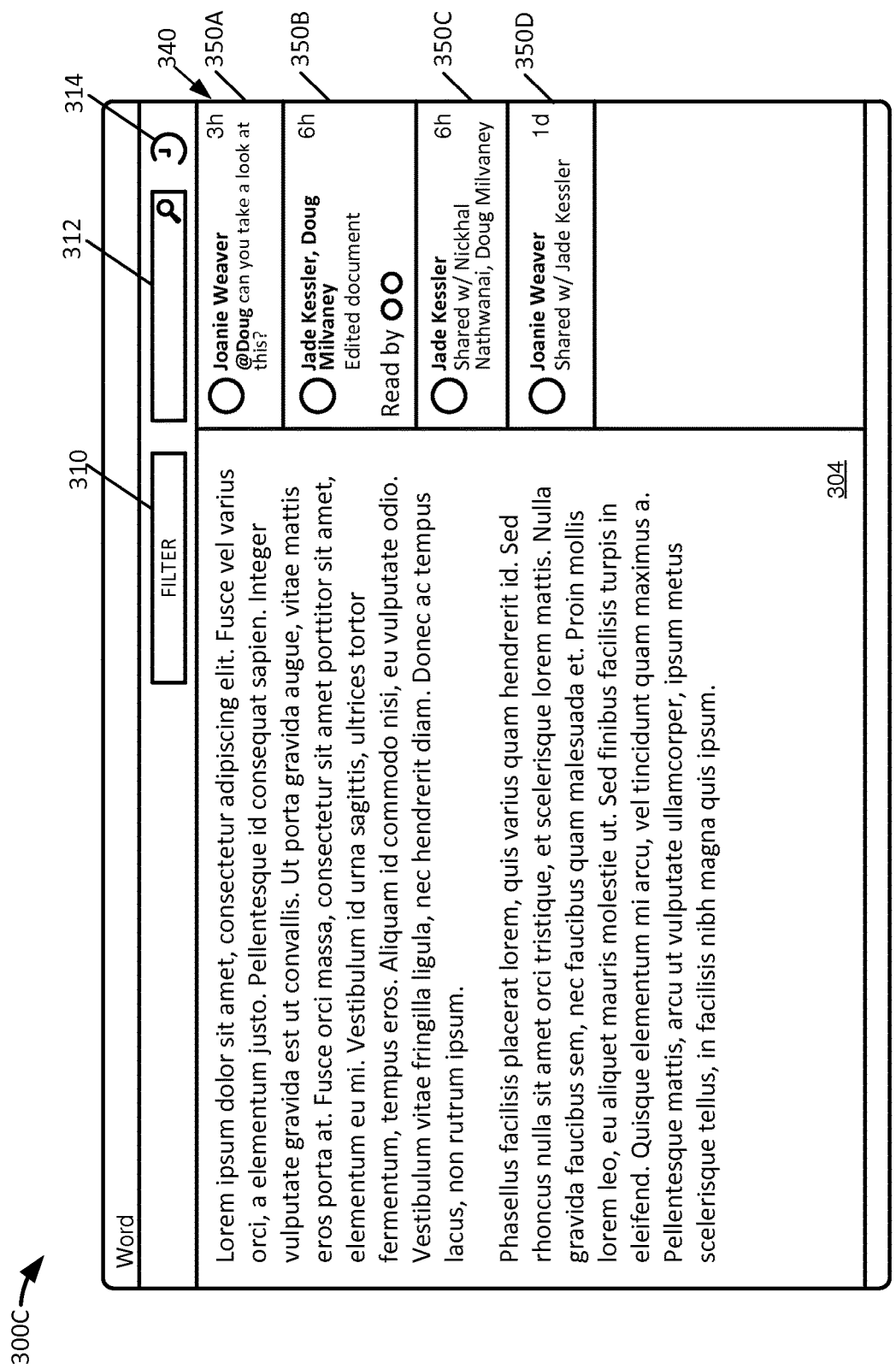
FIG. 3C illustrates another view in the progression of views of the word processing application of FIG. 3A, according to an example aspect.

Referring now to FIG. 3C, another view 300C in a progression of views of a word processing application displayed on a user interface of the client computing device 104, such as a desktop computer, tablet computer or a mobile phone, for example, is shown. As illustrated, the exemplary view 300C of the word processing application displayed on the client computing device 104 includes the file 304, the filter icon 310, the query feature 312, the file activity feed icon 314, a filtered file activity feed 340, and file activity elements 350A-350D. The filtered file activity feed 340 includes the selected filter preferences as illustrated in FIG. 3B. For example, file activity element 350A includes a comment, file activity element 350B includes an edit, file activity element 350C includes a shared activity, and file activity element 350D includes a shared activity. In another example, file activity element 350A includes the identifier Joanie Weaver, file activity element 350B includes the identifiers Jade Kessler and Doug Milvaney, file activity element 350C includes the identifier Jade Kessler, and file activity element 350D includes the identifier Joanie Weaver. As such, the filtered file activity feed 340 includes only those activities that include the selected activity types edits, comments, and shares for the selected identifiers Joanie Weaver, Jade Kessler, and Doug Milvaney.

Figure 4:
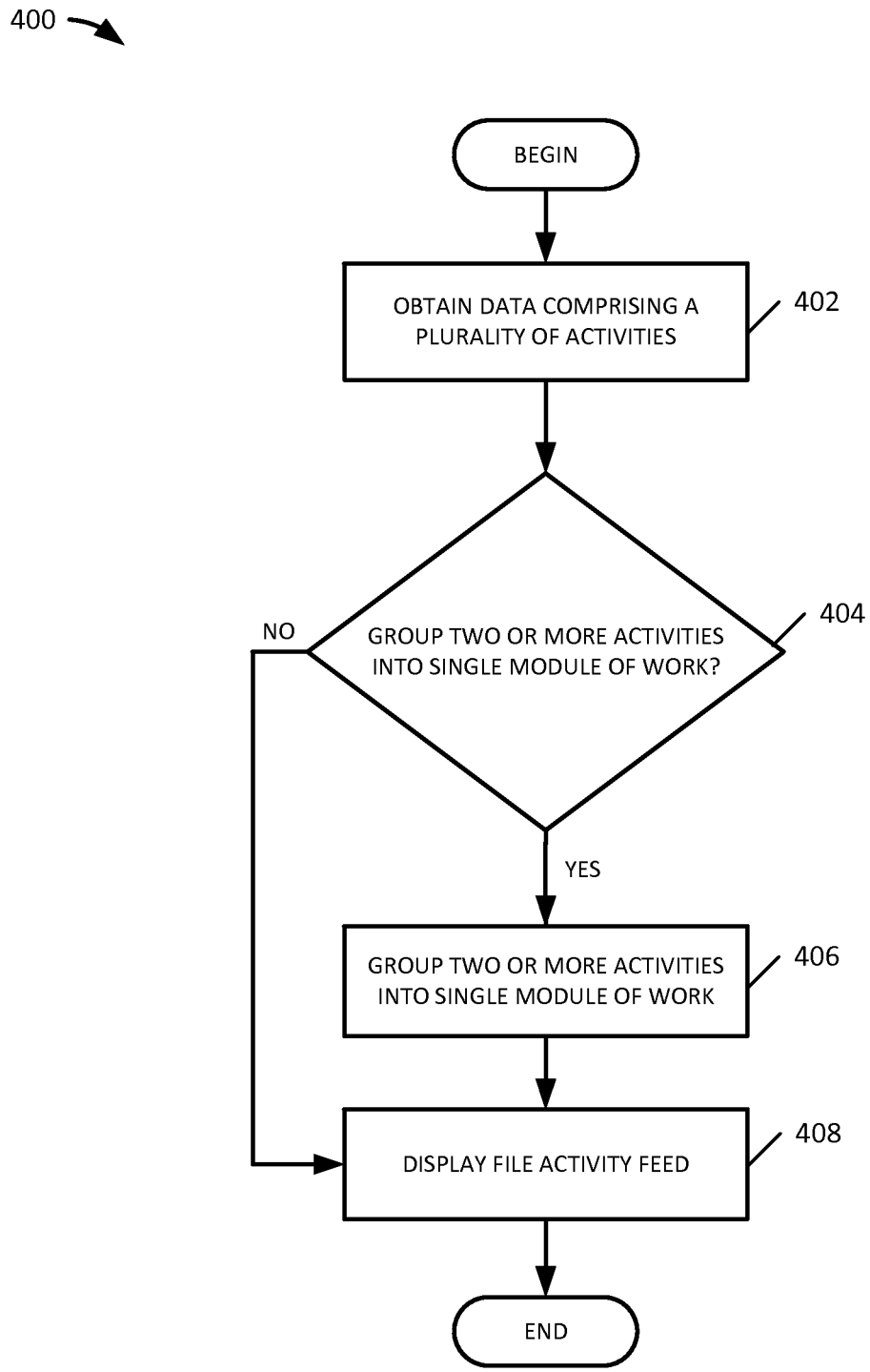
FIG. 4 illustrates an exemplary method for displaying a file activity feed on a user interface of a client computing device, according to an example aspect.

Referring now to FIG. 4, an exemplary method 400 for displaying a file activity feed on a user interface of a client computing device, according to an example aspect is shown. Method 400 may be implemented on a computing device or a similar electronic device capable of executing instructions through at least one processor. The file activity feed may be displayed by any suitable software application. For example, the software application may be one of an email application, a social networking application, project management application, a collaboration application, an enterprise management application, a messaging application, a word processing application, a spreadsheet application, a database application, a presentation application, a contacts application, a calendaring application, etc. This list is exemplary only and should not be considered as limiting. Any suitable application for displaying the file activity feed may be utilized by method 400.

Method 400 may begin at operation 402, where data comprising a plurality of activities associated with a file is obtained. In some cases, the data is obtained on a per user/co-author basis. For example, a different file activity feed may be created for each user/co-author of the file. In this regard, the file activity feed may include activities and distinct modules of work that have occurred since the co-author last viewed the file. In some aspects, the data may be obtained from one or more sources. For example, the data may be obtained from at least a storage service and a data store. In some cases, the data may be obtained from a plurality of storage services and/or data stores. In one case, the data obtained may include metadata associated with the plurality of activities. For example, the metadata may include at least an identifier, a timestamp, and a type of activity.

When data comprising a plurality of activities associated with a file is obtained, flow proceeds to decision operation 404 where it is determined whether to group two or more activities of the plurality of activities into a single module of work. In one example, determining whether to group two or more activities of the plurality of activities into a single module of work comprises identifying one or more similarities among the plurality of activities based on one or more factors. In one case, the one or more factors may include a number of co-authors, a time co-authors join the file or an editing session associated with the file, a time co-authors leave the file or an editing session associated with the file, a type of activity (e.g., any of the activities described herein), a time of a content change, a duration of a content change, a size of a content change, a number of a same type of activity that has occurred in a row, and a number of a same type of activity that has occurred in a set period of time.

When it is determined to group two or more activities of the plurality of activities into the single module of work, flow proceeds to operation 406 where two or more activities are grouped into the single module of work for display within the file activity feed. For example, the single module of work may be a distinct file activity element within the file activity feed that includes multiple activities and metadata associated with the multiple activities. In this regard, the single module of work may be a scenario-optimized module of work. For example, the grouping component may identify one or more similarities and/or patterns among the plurality of activities based on one or more factors. Based on the one or more factors, varying activities may be grouped into the single module of work (e.g., scenario optimized) to better represent what happened to a file within a given time frame, for example. In one example, the optimized scenarios may include single authoring, simultaneous co-authoring, and asynchronous co-authoring.

When it is determined not to group two or more activities of the plurality of activities into the single module of work, flow proceeds to operation 408, where the two or more activities of the plurality of activities are displayed as one or more file activity elements within the file activity feed. In one example, the two or more activities of the plurality of activities include a same type of activity. In another example, at least one of the two or more activities includes a different type of activity than at least another one of the two or more activities.

When two or more activities are grouped into the single module of work for display within the file activity feed, flow proceeds to operation 408 where the file activity feed is displayed on the user interface of the client computing device. The file activity feed may include one or more file activity elements. In one case, the one or more file activity elements may include at least the single module of work. In another case, the one or more file activity elements may include two or more activities determined not to be grouped into a single module of work.

Figure 5:
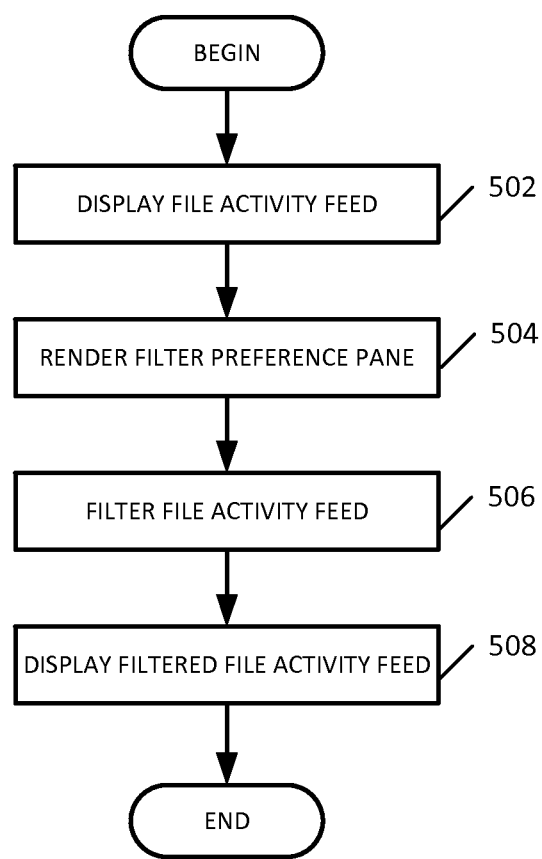
FIG. 5 illustrates an exemplary method for filtering a file activity feed, according to an example aspect.

Referring now to FIG. 5, an exemplary method 500 for filtering a file activity feed, according to an example aspect is shown. Method 500 may be implemented on a computing device or a similar electronic device capable of executing instructions through at least one processor. Method 500 begins at operation 502 where a file activity feed is displayed on a user interface of a client computing device. In one example, the file activity feed may include at least one or more file activity elements and a filter icon. The one or more file activity elements may include one or more activities and/or one or more single modules of work. In one example, the filter icon may be configured to provide a filter preference pane for filtering the file activity feed. For example, users and/or co-authors of a file may choose to filter the file activity feed by and/or for particular types of activities, date ranges, and/or users who performed the activity. In one example, the filter icon may be located within the file activity feed. In another example, the filter icon may be located within the file.

At operation 504, in response to receiving a selection of the filter icon, a filter preference pane including one or more filter preferences for filtering the file activity feed may be rendered on the user interface. In some examples, the filter preference pane may be rendered within the file. In other examples, the filter preference pane may be rendered within the file next to the file contents within the canvas. In one case, the filter preference pane may be rendered and/or displayed over the file activity feed. In one example, the one or more filter preferences for filtering the file activity feed may include at least a type of activity, a timestamp associated with an activity, and an identifier associated with an activity. In one case, the type of activity may indicate the type of activity that occurred and/or was performed by a user relative to the file such as any of the activities described herein. In one example, the timestamp may indicate a time at which the activity was performed. In another example, the timestamp may indicate an amount of time that has passed since an activity was performed. The identifier associated with the activity may be an identifier of a user and/or co-author of the file. The identifier may indicate the user and/or co-author who performed an activity.

At operation 506, in response to receiving a selection of at least one of the one or more filter preferences, the file activity feed may be filtered based on the selection of the at least one of the one or more filter preferences. For example, the one or more filter preferences may include an edit type of activity. In this case, a user may select the edit type of activity as a filter preference. Based on this selection, the file activity feed may be filtered by edit activities. In another example, the one or more filter preferences may include a timestamp. In this case, a user may select a specific time and/or duration of time as a filter preference. Based on this selection, the file activity feed may be filtered by activities that occurred at a specific time and/or activities that occurred within a duration of time (e.g., within the last hour). In another example, the one or more filter preferences may include a user/author identifier. In this case, a user may select a user/author identifier as a filter preference. Based on this selection, the file activity feed may be filtered by a user/author identifier. In one case, the user/author identifier is the name of the user/author. In some cases, the file activity feed may be filtered based on a notification. For example, a user may receive a notification including one or more activities that have occurred to a file within a specific period of time (e.g., within the last two days). When the user receives the notification, the user may open the file from the notification. When the file is opened from the notification, the file may include a filtered file activity feed based on the one or more activities included in the notification (e.g., the one or more activities that have occurred within the last two days).

When the file activity feed is filtered based on the selection of the at least one of the one or more filter preferences, flow proceeds to operation 508 where the filtered file activity feed is displayed on the user interface of the client computing device. For example, the filtered file activity feed may include only those activities that include the selected filter preferences. In one case, the filtered file activity feed may be displayed within the file associated with the filtered file activity feed. In another case, the filtered file activity feed may be displayed next to the contents on a canvas of the file associated with the filtered file activity feed. The displayed filtered file activity feed provides a quick, easy, and efficient way for users and/or co-authors to view those activities that are most of interest to them, as well as narrow the set of activities displayed within the file activity feed to those activities that are important to them and/or specifically directed to them.

The term rendering as used herein generally refers to the various capabilities employed in various computing architectures to assemble information that can then be used by other capabilities to generate an image or images. Within the context of method 500, for example, rendering a filter preference pane, for example, generally refers to assembling the information or data used to generate an image or images that together result in the filter preference pane. Animation or other dynamics may also be used to achieve certain effects.

However, it may be appreciated that other perspectives on rendering may be considered within the scope of the present disclosure. For example, rendering as used herein may also, in some scenarios, be considered to refer to the various capabilities employed by various computing architectures to generate an image or images from information assembled for that purpose. With respect to the method 500, rendering a filter preference pane may refer to generating an image or images, from information assembled for that purpose, that together result in the filter preference pane, which can then be displayed.

It may also be appreciated that rendering in some scenarios may refer to a combination of the aforementioned possibilities. For example, rendering in some scenarios may refer to both assembling the information used to generate an image or images for a filter preference pane and then generating the image or images of the filter preference pane. In addition, a wide variety of other steps, processes, and stages may occur within the context of presenting views of an application, all of which may be considered part of presenting a view. Thus, yet one other variation on method 500 includes, but is not limited to, presenting a file activity feed, presenting a filter preference pane, filtering the file activity feed, and presenting the filtered file activity feed.

Figure 6:
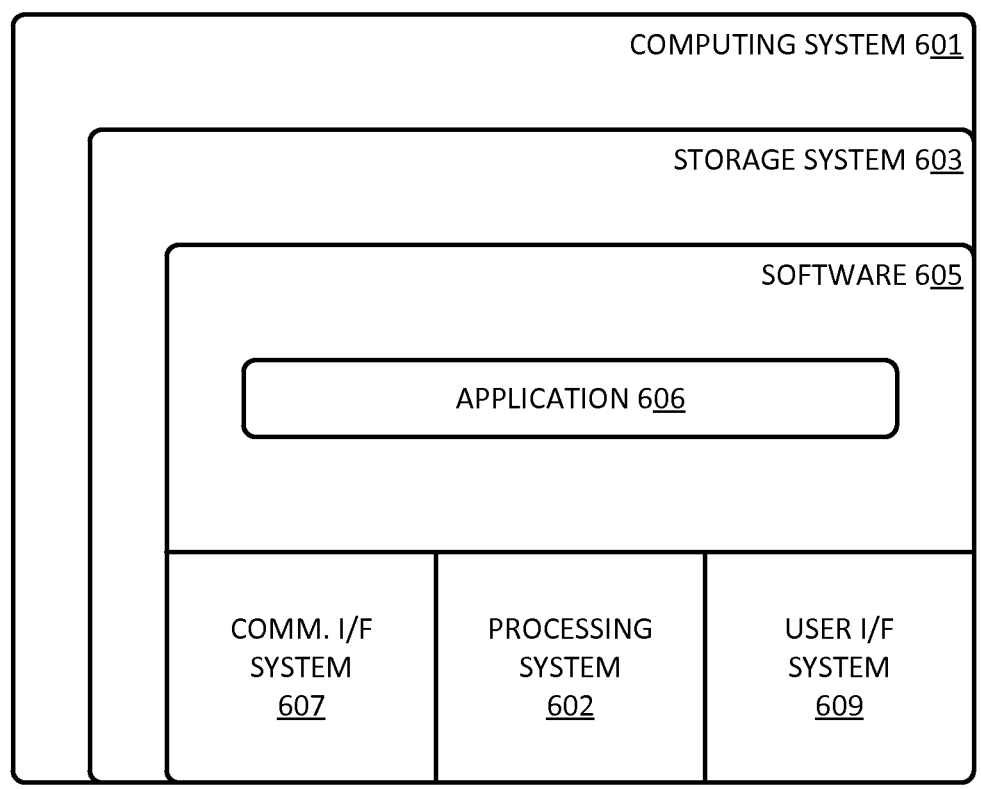
FIG. 6 illustrates a computing system suitable for implementing the enhanced file activity technology disclosed herein, including any of the environments, architectures, elements, processes, user interfaces, and operational scenarios and sequences illustrated in the Figures and discussed below in the Technical Disclosure.

FIG. 6 illustrates computing system 601 that is representative of any system or collection of systems in which the various applications, services, scenarios, and processes disclosed herein may be implemented. Examples of computing system 601 include, but are not limited to, server computers, rack servers, web servers, cloud computing platforms, and data center equipment, as well as any other type of physical or virtual server machine, container, and any variation or combination thereof. Other examples may include smart phones, laptop computers, tablet computers, desktop computers, hybrid computers, gaming machines, virtual reality devices, smart televisions, smart watches and other wearable devices, as well as any variation or combination thereof.

Computing system 601 may be implemented as a single apparatus, system, or device or may be implemented in a distributed manner as multiple apparatuses, systems, or devices. Computing system 601 includes, but is not limited to, processing system 602, storage system 603, software 605, communication interface system 607, and user interface system 609. Processing system 602 is operatively coupled with storage system 603, communication interface system 607, and user interface system 609.

Processing system 602 loads and executes software 605 from storage system 603. Software 605 includes application 606, which is representative of the applications discussed with respect to the preceding FIGS. 1-5, including electronic slide applications and word processing applications described herein. When executed by processing system 602 to enhance file activity feeds, software 605 directs processing system 602 to operate as described herein for at least the various processes, operational scenarios, and sequences discussed in the foregoing implementations. Computing system 601 may optionally include additional devices, features, or functionality not discussed for purposes of brevity.

Referring still to FIG. 6, processing system 602 may comprise a micro-processor and other circuitry that retrieves and executes software 605 from storage system 603. Processing system 602 may be implemented within a single processing device, but may also be distributed across multiple processing devices or sub-systems that cooperate in executing program instructions. Examples of processing system 602 include general purpose central processing units, application specific processors, and logic devices, as well as any other type of processing device, combinations, or variations thereof.

Storage system 603 may comprise any computer readable storage media readable by processing system 602 and capable of storing software 605. Storage system 603 may include volatile and nonvolatile, removable and non-removable media implemented in any method or technology for storage of information, such as computer readable instructions, data structures, program modules, or other data. Examples of storage media include random access memory, read only memory, magnetic disks, optical disks, flash memory, virtual memory and non-virtual memory, magnetic cassettes, magnetic tape, magnetic disk storage or other magnetic storage devices, or any other suitable storage media. In no case is the computer readable storage media a propagated signal.

In addition to computer readable storage media, in some implementations storage system 603 may also include computer readable communication media over which at least some of software 605 may be communicated internally or externally. Storage system 603 may be implemented as a single storage device, but may also be implemented across multiple storage devices or sub-systems co-located or distributed relative to each other. Storage system 603 may comprise additional elements, such as a controller, capable of communicating with processing system 602 or possibly other systems.

Software 605 may be implemented in program instructions and among other functions may, when executed by processing system 602, direct processing system 602 to operate as described with respect to the various operational scenarios, sequences, and processes illustrated herein. For example, software 605 may include program instructions for implementing enhanced file activity feeds.

In particular, the program instructions may include various components or modules that cooperate or otherwise interact to carry out the various processes and operational scenarios described herein. The various components or modules may be embodied in compiled or interpreted instructions, or in some other variation or combination of instructions. The various components or modules may be executed in a synchronous or asynchronous manner, serially or in parallel, in a single threaded environment or multi-threaded, or in accordance with any other suitable execution paradigm, variation, or combination thereof. Software 605 may include additional processes, programs, or components, such as operating system software, virtual machine software, or other application software, in addition to or that include application 606. Software 605 may also comprise firmware or some other form of machine-readable processing instructions executable by processing system 602.

In general, software 605 may, when loaded into processing system 602 and executed, transform a suitable apparatus, system, or device (of which computing system 601 is representative) overall from a general-purpose computing system into a special-purpose computing system customized to facilitate enhanced file activity feeds. Indeed, encoding software 605 on storage system 603 may transform the physical structure of storage system 603. The specific transformation of the physical structure may depend on various factors in different implementations of this description. Examples of such factors may include, but are not limited to, the technology used to implement the storage media of storage system 603 and whether the computer-storage media are characterized as primary or secondary storage, as well as other factors.

For example, if the computer readable storage media are implemented as semiconductor-based memory, software 605 may transform the physical state of the semiconductor memory when the program instructions are encoded therein, such as by transforming the state of transistors, capacitors, or other discrete circuit elements constituting the semiconductor memory. A similar transformation may occur with respect to magnetic or optical media. Other transformations of physical media are possible without departing from the scope of the present description, with the foregoing examples provided only to facilitate the present discussion.

Communication interface system 607 may include communication connections and devices that allow for communication with other computing systems (not shown) over communication networks (not shown). Examples of connections and devices that together allow for inter-system communication may include network interface cards, antennas, power amplifiers, RF circuitry, transceivers, and other communication circuitry. The connections and devices may communicate over communication media to exchange communications with other computing systems or networks of systems, such as metal, glass, air, or any other suitable communication media. The aforementioned media, connections, and devices are well known and need not be discussed at length here.

User interface system 609 is optional and may include a keyboard, a mouse, a voice input device, a touch input device for receiving a touch gesture from a user, a motion input device for detecting non-touch gestures and other motions by a user, and other comparable input devices and associated processing elements capable of receiving user input from a user. Output devices such as a display, speakers, haptic devices, and other types of output devices may also be included in user interface system 609. In some cases, the input and output devices may be combined in a single device, such as a display capable of displaying images and receiving touch gestures. The aforementioned user input and output devices are well known in the art and need not be discussed at length here.

User interface system 609 may also include associated user interface software executable by processing system 602 in support of the various user input and output devices discussed above. Separately or in conjunction with each other and other hardware and software elements, the user interface software and user interface devices may support a graphical user interface, a natural user interface, or any other type of user interface.

Communication between computing system 601 and other computing systems (not shown), may occur over a communication network or networks and in accordance with various communication protocols, combinations of protocols, or variations thereof. Examples include intranets, internets, the Internet, local area networks, wide area networks, wireless networks, wired networks, virtual networks, software defined networks, data center buses, computing backplanes, or any other type of network, combination of network, or variation thereof. The aforementioned communication networks and protocols are well known and need not be discussed at length here. However, some communication protocols that may be used include, but are not limited to, the Internet protocol (IP, IPv4, IPv6, etc.), the transfer control protocol (TCP), and the user datagram protocol (UDP), as well as any other suitable communication protocol, variation, or combination thereof.

In any of the aforementioned examples in which data, content, or any other type of information is exchanged, the exchange of information may occur in accordance with any of a variety of protocols, including FTP (file transfer protocol), HTTP (hypertext transfer protocol), REST (representational state transfer), WebSocket, DOM (Document Object Model), HTML (hypertext markup language), CSS (cascading style sheets), HTML5, XML (extensible markup language), JavaScript, JSON (JavaScript Object Notation), and AJAX (Asynchronous JavaScript and XML), as well as any other suitable protocol, variation, or combination thereof.

Among other examples, the present disclosure presents systems for creating a file activity feed for display on a user interface of a client computing device, the method comprising: obtaining data comprising a plurality of activities associated with a file; grouping two or more activities from the plurality of activities into a single module of work for display within the file activity feed; and displaying the file activity feed on the user interface of the client computing device, wherein the file activity feed includes one or more file activity elements, and wherein the one or more file activity elements include at least the single module of work. In further examples, the one or more file activity elements further include at least one activity of the plurality of activities associated with the file that is different from the two or more activities grouped into the single module of work. In further examples, the data is obtained from one or more sources. In further examples, a user identifier including a last view timestamp is associated with the file, and wherein the one or more file activity elements include the plurality of activities that have occurred since the last view timestamp of the user identifier associated with the file. In further examples, the file activity elements are expandable and collapsible. In further examples, when the single module of work is expanded the two or more activities grouped into the single module of work are viewable. In further examples, the plurality of activities comprise a same type of activity. In further examples, at least one of the plurality of activities comprises a different type of activity than at least another one of the plurality of activities. In further examples, the plurality of activities are associated with the client computing device, and wherein the plurality of activities associated with the client computing device include at least one of messaging, communication activities, comments, email activities, a presentation of the file, a time at which the file is printed, and a time at which the file is co-authored. In further examples, the plurality of activities are associated with a server computing device, and wherein the plurality of activities associated with the server computing device include at least one of a recipient of a shared file, renaming a file, editing a file, sharing a file, and information associated with a restored file.

Further aspects disclosed herein provide an exemplary method for creating a file activity feed for display on a user interface of a client computing device, the method comprising: obtaining data comprising a plurality of activities associated with a file; determining whether to group two or more activities of the plurality of activities into a single module of work; in response to determining to group two or more activities of the plurality of activities into the single module of work, grouping the two or more activities into the single module of work for display within the file activity feed; and displaying the file activity feed on the user interface of the client computing device, wherein the file activity feed includes one or more file activity elements, and wherein the one or more file activity elements include at least the single module of work. In further examples, the one or more file activity elements further include at least one activity of the plurality of activities associated with the file that is different from the two or more activities grouped into the single module of work. In further examples, the one or more file activity elements further include metadata associated with at least one of the single module of work and the at least one activity of the plurality of activities. In further examples, the metadata includes at least an identifier, a timestamp, and a type. In further examples, when it is determined not to group two or more activities of the plurality of activities into the single module of work, displaying the two or more activities of the plurality of activities as the one or more file activity elements within the file activity feed. In further examples, determining whether to group two or more activities of the plurality of activities into a single module of work comprises identifying one or more similarities among the plurality of activities based on one or more factors. In further examples, the one or more factors include a number of co-authors, a time co-authors join the file or an editing session associated with the file, a time co-authors leave the file or an editing session associated with the file, a type of activity, a time of a content change, a duration of a content change, a size of a content change, a number of a same type of activity that has occurred in a row, and a number of a same type of activity that has occurred in a set period of time.

Additional aspects disclosed herein provide exemplary systems comprising: one or more computer readable storage media; and program instructions stored on the one or more computer readable storage media that, when executed by at least one processor, cause the at least one processor to at least: display a file activity feed on a user interface of a client computing device, wherein the file activity feed includes at least one or more file activity elements and a filter icon; in response to receiving a selection of the filter icon, render, on the user interface, a filter preference pane including one or more filter preferences for filtering the file activity feed; in response to receiving a selection of at least one of the one or more filter preferences, filter the file activity feed based on the selection of the at least one of the one or more filter preferences; and display the filtered file activity feed on the user interface of the client computing device. In further examples, the one or more filter preferences for filtering the file activity feed include at least a type of activity, a timestamp associated with an activity, and an identifier associated with an activity. In further examples, the file activity feed further includes a query feature for querying the file activity feed.

Techniques for creating and displaying file activity feeds are described. Although aspects are described in language specific to structural features and/or methodological acts, it is to be understood that the aspects defined in the appended claims are not necessarily limited to the specific features or acts described above. Rather, the specific features and acts are disclosed as example forms of implementing the claimed aspects.

A number of methods may be implemented to perform the techniques discussed herein. Aspects of the methods may be implemented in hardware, firmware, or software, or a combination thereof. The methods are shown as a set of blocks that specify operations performed by one or more devices and are not necessarily limited to the orders shown for performing the operations by the respective blocks. Further, an operation shown with respect to a particular method may be combined and/or interchanged with an operation of a different method in accordance with one or more implementations. Aspects of the methods may be implemented via interaction between various entities discussed above with reference to the touchable user interface.

Aspects of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more aspects provided in this application are not intended to limit or restrict the scope of the disclosure as claimed in any way. The aspects, examples, and details provided in this application are considered sufficient to convey possession and enable others to make and use the best mode of claimed disclosure. The claimed disclosure should not be construed as being limited to any aspect, example, or detail provided in this application. Regardless of whether shown and described in combination or separately, the various features (both structural and methodological) are intended to be selectively included or omitted to produce an aspect with a particular set of features. Having been provided with the description and illustration of the present application, one skilled in the art may envision variations, modifications, and alternate aspects falling within the spirit of the broader aspects of the general inventive concept embodied in this application that do not depart from the broader scope of the claimed disclosure.

Additionally, while the aspects may be described in the general context of file activity systems that execute in conjunction with an application program that runs on an operating system on a computing device, those skilled in the art will recognize that aspects may also be implemented in combination with other program modules. In further aspects, the aspects disclosed herein may be implemented in hardware.

Generally, program modules include routines, programs, components, data structures, and other types of structures that perform particular tasks or implement particular abstract data types. Moreover, those skilled in the art will appreciate that aspects may be practiced with other computer system configurations, including hand-held devices, multiprocessor systems, microprocessor-based or programmable consumer electronics, minicomputers, mainframe computers, and comparable computing devices. Aspects may also be practiced in distributed computing environments where tasks are performed by remote processing devices that are linked through a communications network. In a distributed computing environment, program modules may be located in both local and remote memory storage devices.

Aspects may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium can for example be implemented via one or more of a volatile computer memory, a non-volatile memory, a hard drive, a flash drive, a floppy disk, or compact servers, an application executed on a single computing device, and comparable systems.

What is claimed is:
1. A system comprising:
   at least one processor; and
   memory encoding computer executable instructions that, when executed by the at least one processor, cause the at least one processor to create a file activity feed associated with a file that is configured for display in a user interface to the file on a client computing device by:
   obtaining, via a grouping component, data comprising a plurality of activities associated with a file from a storage service that stores one or more files and the plurality of activities associated with the file in a data store;
   identifying, via executing grouping logic, at least one similarity between two or more activities from the plurality of activities;
   aggregating, via the grouping component, the two or more activities from the plurality of activities having the at least one identified similarity into a single module of work, wherein the single module of work is a single file activity element within the file activity feed that includes the two or more aggregated activities having the at least one similarity; and
   generating the file activity feed configured for display in the user interface to the file on the client computing device, the file activity feed including one or more file activity elements including at least the single module of work, wherein each of the one or more file activity elements includes at least one of an activity from the plurality of activities or the single module of work and at least one of the one or more file activity elements is actionable, and wherein an actionable file activity element identifies an action that is automatically performed responsive to user selection or interaction with the actionable file activity element.

2. The system of claim 1, wherein the one or more file activity elements further include at least one activity of the plurality of activities associated with the file that is different from the two or more activities aggregated into the single module of work.

3. The system of claim 1, wherein the action comprises one or more of executing, displaying, copying, storing, deleting, modifying, or facilitating a response to one or more components of the file activity element; and wherein data is obtained from one or more sources.

4. The system of claim 1, wherein a user identifier including a last view timestamp is associated with the file, and wherein the one or more file activity elements include the plurality of activities that have occurred since the last view timestamp of the user identifier associated with the file.

5. The system of claim 1, wherein the file activity elements are expandable and collapsible.

6. The system of claim 5, wherein when the single module of work is expanded the two or more activities aggregated into the single module of work are viewable.

7. The system of claim 1, wherein the plurality of activities comprise a same type of activity.

8. The system of claim 1, wherein at least one of the plurality of activities comprises a different type of activity than at least another one of the plurality of activities.

9. The system of claim 1, wherein the plurality of activities are associated with the client computing device, and wherein the plurality of activities associated with the client computing device include at least one of messaging, communication activities, comments, email activities, a presentation of the file, a time at which the file is printed, and a time at which the file is co-authored.

10. The system of claim 1, wherein the plurality of activities are associated with a server computing device, and wherein the plurality of activities associated with the server computing device include at least one of a recipient of a shared file, renaming a file, editing a file, sharing a file, and information associated with a restored file.

11. A computer-implemented method for creating a file activity feed associated with a file that is configured for display in a user interface to the file on a client computing device, the method comprising:

obtaining, via a grouping component, data comprising a plurality of activities associated with a file from a storage service that stores one or more files and the plurality of activities associated with the file in a data store;

determining, via the grouping component, whether to aggregate two or more activities of the plurality of activities into a single module of work based on whether at least one similarity between the two or more activities from the plurality of activities is identified;

when at least one similarity between the two or more activities is identified, aggregating, via the grouping component, the two or more activities having the at least one similarity into the single module of work, wherein the single module of work is a single file activity element within the file activity feed that includes the two or more aggregated activities;

when at least one similarity between the two or more activities is not identified, creating a single file activity element for each activity of the plurality of activities not aggregated into the single module of work; and generating the file activity feed configured for display in the user interface to the file on the client computing device, the file activity feed including one or more file activity elements, wherein the one or more file activity elements include at least the single module of work, each activity of the plurality of activities not aggregated into the single module of work, and at least one of the one or more file activity elements is actionable, wherein an actionable file activity element identifies an action that is automatically performed responsive to user selection or interaction with the actionable file activity element.

12. The computer-implemented method of claim 11, wherein the one or more file activity elements further include at least one activity of the plurality of activities associated with the file that is different from the two or more activities aggregated into the single module of work.

13. The computer-implemented method of claim 12, wherein the one or more file activity elements further include metadata associated with at least one of the single module of work and the at least one activity of the plurality of activities.

14. The computer-implemented method of claim 11, wherein the metadata includes at least an identifier, a timestamp, and a type.

15. The computer-implemented method of claim 11, further comprising when it is determined not to aggregate two or more activities of the plurality of activities into the single module of work, displaying the two or more activities of the plurality of activities as the one or more file activity elements within the file activity feed.

16. The computer-implemented method of claim 11, wherein the at least one similarity between the two or more activities from the plurality of activities is identified based on one or more factors.

17. The computer-implemented method of claim 16, wherein the one or more factors include a number of co-authors, a time co-authors join the file or an editing session associated with the file, a time co-authors leave the file or an editing session associated with the file, a type of activity, a time of a content change, a duration of a content change, a size of a content change, a number of a same type of activity that has occurred in a row, and a number of a same type of activity that has occurred in a set period of time.

18. A system comprising:

one or more computer readable storage media; and program instructions stored on the one or more computer readable storage media that, when executed by at least one processor, cause the at least one processor to at least:

display a file activity feed associated with a file in a user interface to the file of a client computing device, wherein the file activity feed includes at least one or more file activity elements and a filter icon, wherein at least one of the one or more file activity elements includes a single module of work having two or more aggregated activities with at least one similarity between two or more activities is identified, wherein at least one of the one or more file activity elements are actionable, and wherein an actionable file activity element identifies an action that is automatically performed responsive to user selection or interaction with the actionable file activity element;

in response to receiving a selection of the filter icon, render, in the user interface to the file, a filter preference pane including one or more filter preferences for filtering the file activity feed;

in response to receiving a selection of at least one of the one or more filter preferences, filter the file activity feed based on the selection of the at least one of the one or more filter preferences; and display the filtered file activity feed in the user interface to the file of the client computing device.

19. The system of claim 18, wherein the one or more filter preferences for filtering the file activity feed include at least a type of activity, a timestamp associated with an activity, and an identifier associated with an activity.

20. The system of claim 18, wherein the file activity feed further includes a query feature for querying the file activity feed.

* * * * *